(12) United States Patent
Sekiguchi (10) Patent No.: US 12,076,950 B2
(45) Date of Patent: Sep. 3, 2024

(54) PUNCTURE REPAIR KIT

(71) Applicant: The Yokohama Rubber Co., LTD., Tokyo (JP)

(72) Inventor: Takumi Sekiguchi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 474 days.

(21) Appl. No.: 17/310,428

(22) PCT Filed: Dec. 11, 2019

(86) PCT No.: PCT/JP2019/048378
§ 371 (c)(1),
(2) Date: Aug. 2, 2021

(87) PCT Pub. No.: WO2020/162034
PCT Pub. Date: Aug. 13, 2020

(65) Prior Publication Data
US 2022/0143939 A1 May 12, 2022

(30) Foreign Application Priority Data
Feb. 6, 2019 (JP) .................................. 2019-019781

(51) Int. Cl.
*B29C 73/16* (2006.01)
*B29C 73/02* (2006.01)
*B29C 73/24* (2006.01)

(52) U.S. Cl.
CPC .......... *B29C 73/166* (2013.01); *B29C 73/025* (2013.01); *B29C 73/24* (2013.01)

(58) Field of Classification Search
CPC ..... B29C 73/16; B29C 73/166; B29C 73/025; B29C 73/24
See application file for complete search history.

(56) References Cited

U.S. PATENT DOCUMENTS

| | | | | |
|---|---|---|---|---|
| 6,964,284 | B2 * | 11/2005 | Eckhardt | B29C 73/166 141/38 |
| 7,854,242 | B2 * | 12/2010 | Stehle | B29C 73/166 141/38 |
| 8,205,645 | B2 * | 6/2012 | Dowel | B29C 73/166 141/38 |
| 8,302,636 | B2 * | 11/2012 | Sekiguchi | B29C 73/166 141/38 |

(Continued)

FOREIGN PATENT DOCUMENTS

| | | |
|---|---|---|
| DE | 11 2009 002 513 T5 | 1/2012 |
| DE | 10 2015 203 972 A1 | 9/2015 |

(Continued)

*Primary Examiner* — Nicolas A Arnett
(74) *Attorney, Agent, or Firm* — Thorpe North & Western (57) ABSTRACT

A puncture repair kit includes a container in which puncture repair liquid is contained, a compressor that supplies compressed air, a pressurization hose connected between a pressurizing port of the container and the compressor, and an injection hose connected between an outlet of the container and a tire valve, and further includes a holding fixture that holds an attitude of the container such that the container is in an inverted state in a state in which the container with the outlet being on a lower side is connected to the tire valve via the injection hose and is pendent from the tire valve.

8 Claims, 9 Drawing Sheets

(56) References Cited

U.S. PATENT DOCUMENTS

| | | | | |
|---|---|---|---|---|
| 8,342,215 | B2* | 1/2013 | Sekiguchi | B29C 73/166 |
| | | | | 141/38 |
| 8,459,150 | B2* | 6/2013 | Yoshida | B29C 73/166 |
| | | | | 81/15.3 |
| 9,227,369 | B2* | 1/2016 | Jhou | B29C 73/166 |
| 9,533,455 | B2* | 1/2017 | Takahara | B29C 73/166 |
| 9,656,305 | B2* | 5/2017 | Sekiguchi | B60S 3/042 |
| 10,919,503 | B2* | 2/2021 | Sekiguchi | B29C 73/166 |
| 11,046,128 | B2* | 6/2021 | Chou | B29C 73/166 |
| 11,207,853 | B2* | 12/2021 | Sekiguchi | B29C 73/166 |
| 11,813,813 | B2* | 11/2023 | Schlosser | B29C 73/166 |
| 2010/0071801 | A1* | 3/2010 | Sekiguchi | B29C 73/166 |
| | | | | 141/105 |
| 2010/0071822 | A1* | 3/2010 | Sekiguchi | B29C 73/166 |
| | | | | 152/504 |
| 2011/0192492 | A1* | 8/2011 | Kanenari | B29C 73/166 |
| | | | | 141/38 |
| 2015/0059920 | A1* | 3/2015 | Takahara | B29C 73/025 |
| | | | | 141/38 |

FOREIGN PATENT DOCUMENTS

| | | |
|---|---|---|
| EP | 1 914 062 A1 | 4/2008 |
| JP | 2010-069847 A | 4/2010 |
| JP | 2013-220622 A | 10/2013 |
| JP | 2013-223952 A | 10/2013 |
| JP | 2013-223953 A | 10/2013 |
| JP | 2017-177389 A | 10/2017 |

* cited by examiner

PUNCTURE REPAIR KIT

TECHNICAL FIELD

The present technology relates to a puncture repair kit of a type that injects puncture repair liquid contained in a container into a tire by compressed air of a compressor, and particularly relates to a puncture repair kit that can appropriately set an attitude of a container that is in a pendent state from a tire valve via an injection hose during use to reliably discharge the puncture repair liquid in the container.

BACKGROUND ART

In recent years, when a tire mounted on a vehicle is punctured, a puncture repair liquid is injected into the tire via a tire valve to temporarily repair the puncture. Examples of a device that allows such a temporary repair include an onboard puncture repair kit. Employing a puncture repair kit eliminates the need to provide the vehicle with a spare tire, which makes it possible to save resources and reduce the weight of the vehicle. There is also a further advantage that the space in the vehicle where the spare tire would have been provided can be used for other purposes.

A puncture repair kit includes, for example, a container in which puncture repair liquid is contained, a compressor that supplies compressed air, a pressurization hose connected between a pressurizing port of the container and the compressor, and an injection hose connected between an outlet of the container and a tire valve (for example, see Japan Unexamined Patent Publication No. 2013-220622). While shortening the hose has been considered for further weight reduction and cost reduction of such a puncture repair kit, when the injection hose is short, the puncture repair kit might be used with the container being pendent from the tire valve via the injection hose depending on the position of the tire valve during puncture repair work. Because the container tilts in such a pendent state, it is not possible to sufficiently discharge the puncture repair liquid in the container, and there is a risk that puncture repair will not be appropriately performed. Accordingly, there is a demand for a solution for reliably discharging the puncture repair liquid in the container by correcting the tilt of the container even when the container is in a pendent state from the tire valve via the hose.

SUMMARY

The present technology provides a puncture repair kit that can appropriately set an attitude of a container that is in a pendent state from a tire valve via an injection hose during use to reliably discharge puncture repair liquid in the container.

A puncture repair kit of an embodiment of the present technology includes a container in which puncture repair liquid is contained, a compressor that supplies compressed air, a pressurization hose connected between a pressurizing port of the container and the compressor, and an injection hose connected between an outlet of the container and a tire valve. The puncture repair kit further includes a holding fixture that holds an attitude of the container such that the container is in an inverted state in a state in which the container with the outlet being on a lower side is connected to the tire valve via the injection hose and is pendent from the tire valve.

According to the present technology, the puncture repair kit includes the holding fixture for holding the attitude of the container, and thus the attitude of the container can be held such that the container is in an inverted state by the holding fixture in a state in which the container with the outlet being on the lower side is connected to the tire valve via the injection hose and is pendent from the tire valve. As a result, the attitude of the container that is in a pendent state from the tire valve via the injection hose during use can be appropriately set to reliably discharge the puncture repair liquid in the container.

According to the present technology, the holding fixture preferably includes a length adjustment mechanism configured to adjust a length of the holding fixture. By adjusting the length of the holding fixture based on such a length adjustment mechanism, the attitude of the container can be easily appropriately set.

The holding fixture preferably includes a first connecting portion that serves to provide a connection to the tire valve and a second connecting portion that serves to provide a connection to the container. As a result, the holding fixture is mounted so as to span between the tire valve and the container, and thus the attitude of the container can be stably held. In particular, the second connecting portion of the holding fixture preferably includes a double-sided tape or a surface fastener. This allows the attitude of the container to be easily adjusted.

The holding fixture preferably has stretchability in part or in whole. When adopting such a configuration, even when the container is tilted in the initial stage of injection of the puncture repair liquid, the attitude of the container can be held such that the container is in an inverted state as the container becomes lighter in the later stage of injection. There is also an advantage that the completion of the injection operation can be recognized by the change in the attitude of the container.

The holding fixture may include at least one engagement portion that engages with the injection hose, the holding fixture having a structure that regulates the curvature of the injection hose in a state in which the holding fixture is mounted on the injection hose by the engagement portion. In particular, the holding fixture preferably includes two engagement portions that engage with both end portions of the injection hose. In this case as well, the attitude of the container that is in a pendent state from the tire valve via the injection hose during use can be appropriately set to reliably discharge the puncture repair liquid in the container.

BRIEF DESCRIPTION OF DRAWINGS

FIGS. 1A and 1B are side views illustrating a puncture repair kit according to an embodiment of the present technology.

FIGS. 4A and 4B illustrate a modified example of the holding fixture.

FIGS. 5A and 5B illustrate a modified example of the holding fixture.

FIGS. 9A and 9B are side views illustrating the state in which the holding fixture of FIGS. 8A and 8B is mounted in the puncture repair kit.

FIGS. 10A to 10C illustrate a modified example of the holding fixture.

DETAILED DESCRIPTION

Figure 1A:
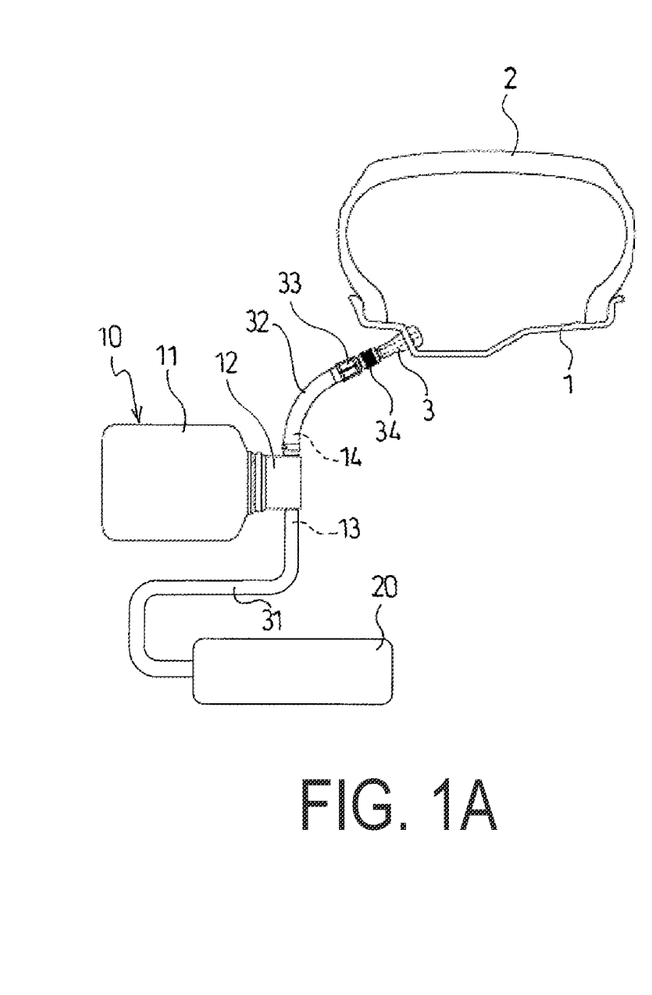
FIG. 1A is a side view illustrating a state prior to mounting the holding fixture.
Figure 1B:
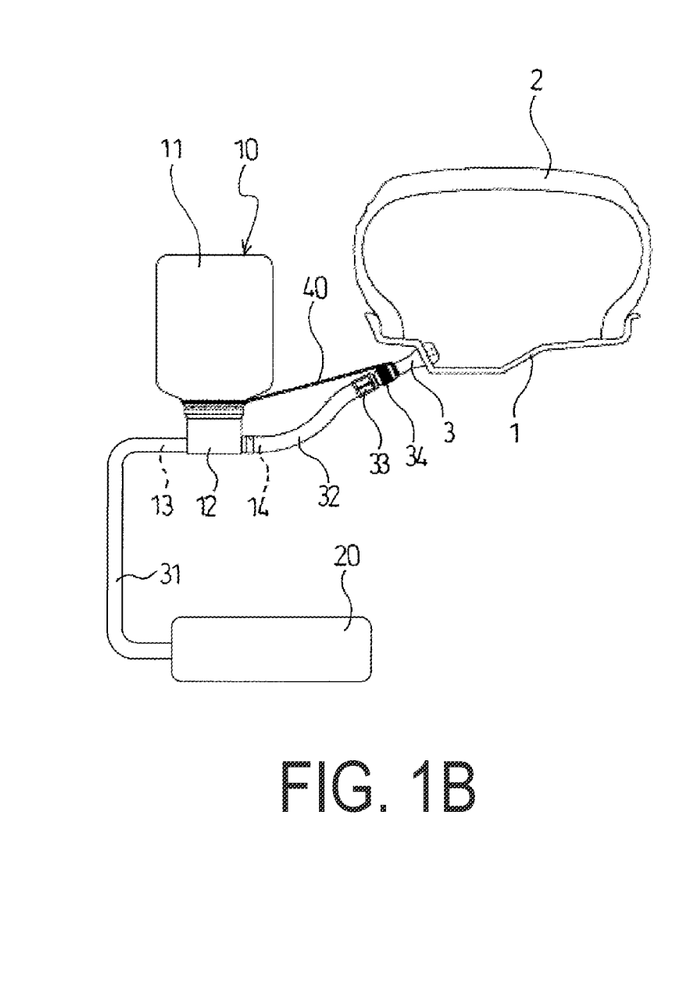
FIG. 1B is a side view illustrating a state in which the holding fixture is mounted.

Configurations of embodiments of the present technology will be described in detail below with reference to the accompanying drawings. FIGS. 1A and 1B illustrate a puncture repair kit according to an embodiment of the present technology, FIGS. 2A and 2B each illustrate a specific example of a holding fixture, and FIG. 3 illustrates the container in an inverted state. In FIGS. 1A and 1B, 1 is a wheel, 2 is a pneumatic tire mounted on the wheel 1, and 3 is a tire valve 3 provided on the wheel 1.

As illustrated in FIGS. 1A and 1B, the puncture repair kit of the present embodiment includes a container 10 in which puncture repair liquid is contained and a compressor 20 that supplies compressed air. The container 10 includes a container body 11 in which puncture repair liquid is contained and a cap 12 mounted on an opening portion of the container body 11. A pressurizing port 13 and an outlet 14 that communicate with an internal space of the container body 11 are formed on the cap 12. Here, a pressurization hose 31 is connected between the pressurizing port 13 of the container 10 and the compressor 20. Also, an injection hose 32 is connected between the outlet 14 of the container 10 and the tire valve 3. The injection hose 32 has one end fixed to the outlet 14 of the container 10 by a binding member or the like, and the other end on which a threaded connecting joint 34 is mounted by a swaging metal fitting 33. The connecting joint 34 is configured to be rotatable with respect to the injection hose 32 to be threadably mounted on the tire valve 3. In addition, in order to reduce the weight, the injection hose 32 has a hose length that includes the connecting joint 34 set, for example, in a range of from 50 mm to 100 mm.

Figure 2A:
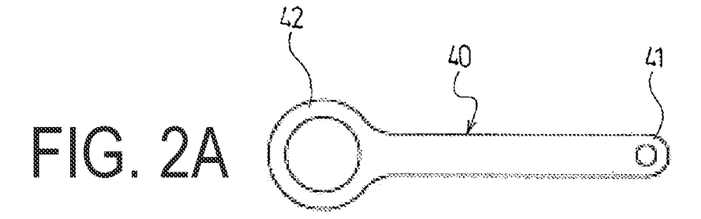
FIGS. 2A and 2B are plan views each illustrating a specific example of the holding fixture.
Figure 2B:
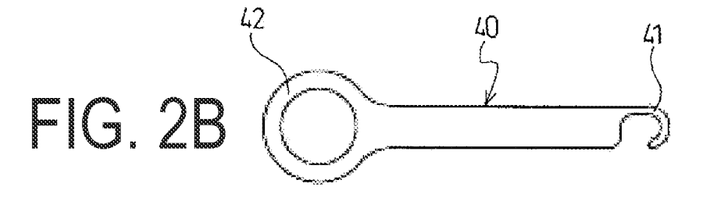
Figure 3:
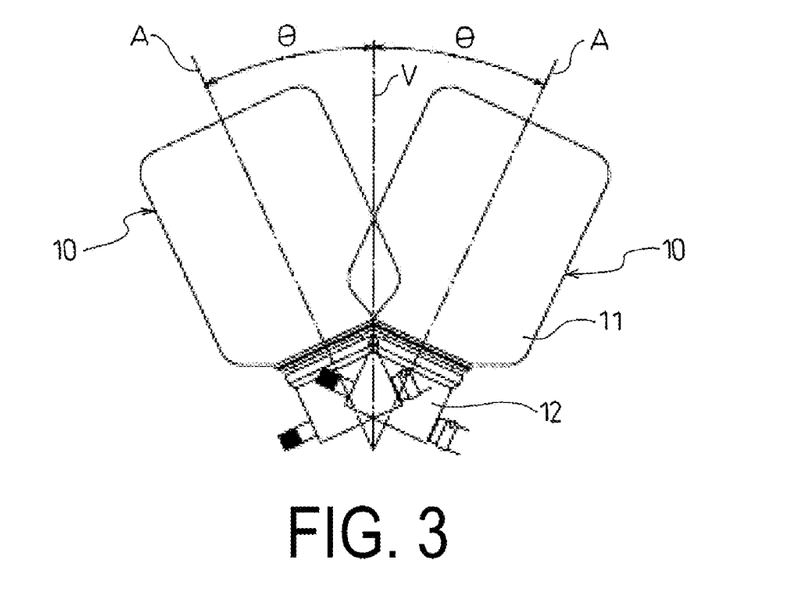
FIG. 3 is a side view illustrating an inverted state of the container.

As illustrated in FIGS. 2A and 2B, the holding fixture 40 for holding the attitude of the container 10 has a first connecting portion 41 that serves to provide a connection to the tire valve 3 and a second connecting portion 42 that serves to provide a connection to the container 10. In FIG. 2A, the first connecting portion 41 is a ring body into which the tire valve 3 is inserted, and the second connecting portion 42 is a ring body into which a portion of the container 10 is inserted. In FIG. 2B, the first connecting portion 41 is a hook body that is hooked around the tire valve 3, and the second connecting portion 42 is a ring body into which a portion of the container 10 is inserted. The constituent material of the holding fixture 40 is not particularly limited, and examples thereof include resins, fibers, and metals. In particular, a material capable of retaining the shape of the holding fixture 40 is preferably selected.

Next, a puncture repair method using the puncture repair kit described above will be described. As illustrated in FIG. 1A, when the pneumatic tire 2 is punctured, the pressurization hose 31 is first connected between the pressurizing port 13 of the container 10 in which the puncture repair liquid is contained and the compressor 20, and the container 10 is connected to the tire valve 3 via the injection hose 32 such that the outlet 14 is on the lower side. This causes the container 10 to be in a pendent state from the tire valve 3. In this state, the container 10 in which the puncture repair liquid is contained tilts greatly with respect to the vertical direction due to its own weight.

As illustrated in FIG. 1B, the first connecting portion 41 of the holding fixture 40 is then mounted on the tire valve 3, while the second connecting portion 42 is mounted on the container 10. Note that when the holding fixture 40 has a structure as illustrated in FIGS. 2A and 2B, the second connecting portion 42 is preferably pre-mounted on the container 10. As illustrated in FIG. 1B, by mounting the holding fixture 40 so as to span between the tire valve 3 and the container 10, the container 10 can be held in an attitude such that the container 10 is in an inverted state. Accordingly, when the compressor 20 is operated in this state to perform injection operation of the puncture repair liquid, the attitude of the container 10 that is in a pendent state from the tire valve 3 via the injection hose 32 can be appropriately set to reliably discharge the puncture repair liquid in the container 10.

The inverted state of the container 10 means the following state. That is, as illustrated in FIG. 3, the container 10 is in an inverted state in a state in which the container 10 with the outlet 14 being on the lower side is connected to the tire valve 3 via the injection hose 32 and is pendent from the tire valve 3, and when an angle θ of the center axis A of the container 10 with respect to the vertical direction V is in a range of 25° or less. In such an inverted state, compressed air is introduced into the pressurizing port 13 of the container 10, thereby the puncture repair liquid in the container 10 is reliably discharged from the outlet 14 on the lower side.

Figure 4A:
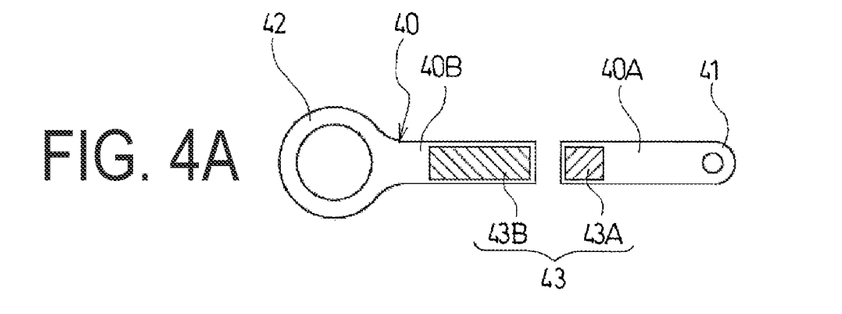
FIG. 4A is a plan view thereof.
Figure 4B:
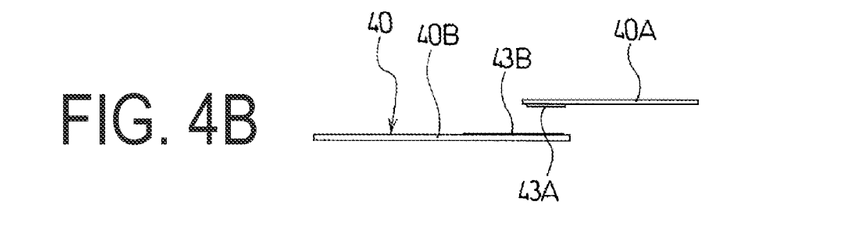
FIG. 4B is a side view thereof.

FIGS. 4A and 4B illustrate a modified example of the holding fixture. In FIGS. 4A and 4B, the holding fixture 40 includes a divided piece 40A including a first connecting portion 41 and a divided piece 40B including a second connecting portion 42. A surface fastener 43A is affixed to the divided piece 40A, a surface fastener 43B is affixed to the divided piece 40B, and the surface fasteners 43A and 43B constitute a length adjustment mechanism 43. By changing the engagement position between the surface fasteners 43A and 43B, the length of the holding fixture 40 can be adjusted as desired. By adjusting the length of the holding fixture 40 based on such a length adjustment mechanism 43, the attitude of the container 10 can be easily appropriately set.

Figure 5A:
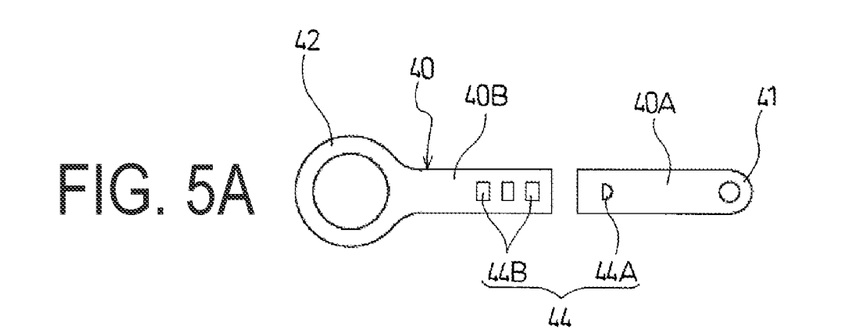
FIG. 5A is a plan view thereof.
Figure 5B:
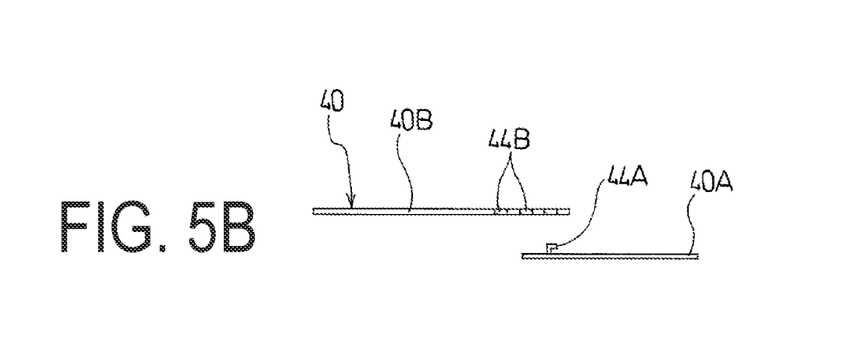
FIG. 5B is a side view thereof.

FIGS. 5A and 5B illustrate another modified example of the holding fixture. In FIGS. 5A and 5B, the holding fixture 40 includes a divided piece 40A including a first connecting portion 41 and a divided piece 40B including a second connecting portion 42. A catch portion 44A is formed on the divided piece 40A, a plurality of opening portions 44B are formed on the divided piece 40B along the longitudinal direction thereof, and the catch portion 44A and the plurality of opening portions 44B constitute the length adjustment mechanism 44. The length of the holding fixture 40 can be adjusted as desired by selecting, when the catch portion 44A is catching an opening portion 44B, the position of the opening portion 44B. By adjusting the length of the holding fixture 40 based on such a length adjustment mechanism 44, the attitude of the container 10 can be easily appropriately set.

Figure 6A:
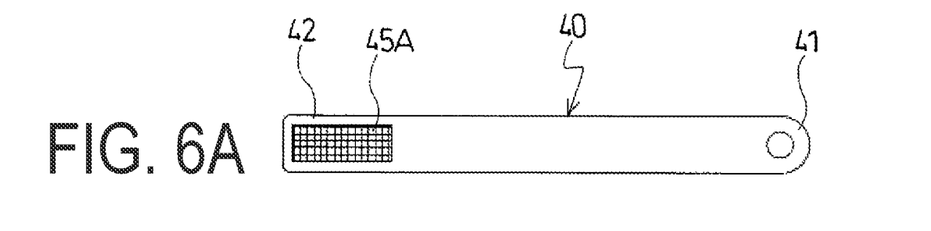
FIGS. 6A and 6B are plan views each illustrating a modified example of the holding fixture.
Figure 6B:
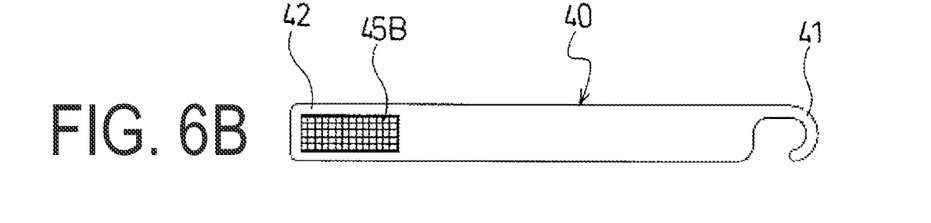
Figure 7:
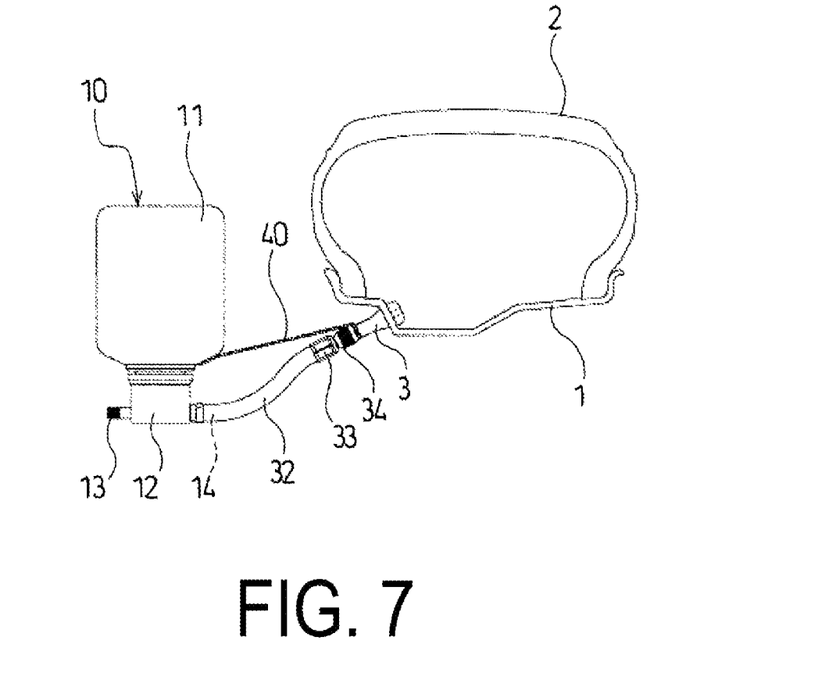
FIG. 7 is a side view illustrating a state in which the holding fixture of FIGS. 6A and 6B is mounted in the puncture repair kit.

FIGS. 6A and 6B each illustrate yet another modified example of the holding fixture, and FIG. 7 illustrates a state in which the holding fixture of FIGS. 6A and 6B is mounted in the puncture repair kit. In the following drawings, the description of the compressor 20 and the pressurization hose 31 is omitted. In FIGS. 6A and 6B, the holding fixture 40 has a first connecting portion 41 that serves to provide a connection to the tire valve 3 and a second connecting portion 42 that serves to provide a connection to the container 10, and the second connecting portion 42 includes a double-sided tape 45A or a surface fastener 45B.

As illustrated in FIG. 7, the first connecting portion 41 of the holding fixture 40 is mounted on the tire valve 3, while the second connecting portion 42 is mounted on any portion of the container 10 by a double-sided tape 45A or a surface fastener 45B. This allows the attitude of the container 10 to be easily adjusted. In particular, by increasing the setting range of the double-sided tape 45A or the surface fastener 45B in the longitudinal direction of the holding fixture 40, it is possible to increase the adjustment range of the attitude of the container 10. Note that when using a surface fastener 45B, it is necessary to affix another surface fastener to be paired with the surface fastener 45B to the container 10. Also, the second connection portion 42 may be mounted on a portion of the upper side of the container 10.

Figure 8A:
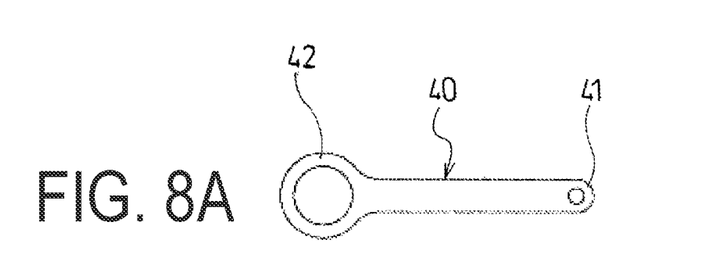
FIGS. 8A and 8B are plan views each illustrating a modified example of the holding fixture.
Figure 8B:
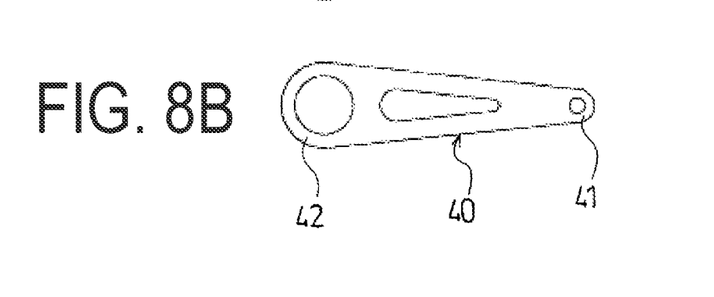
Figure 9A:
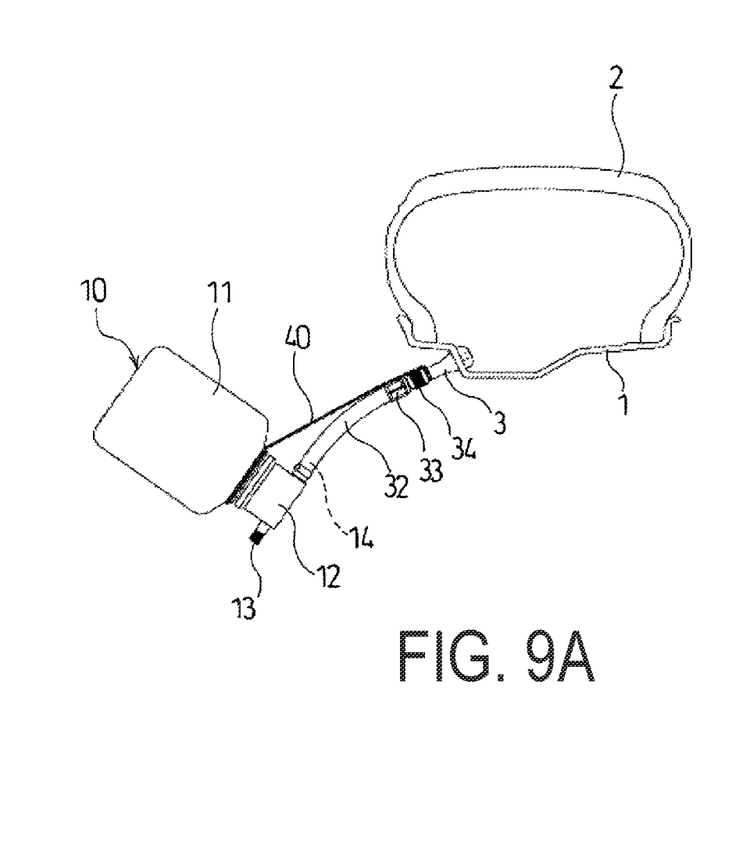
FIG. 9A is a side view illustrating a state of an initial stage of injection.
Figure 9B:
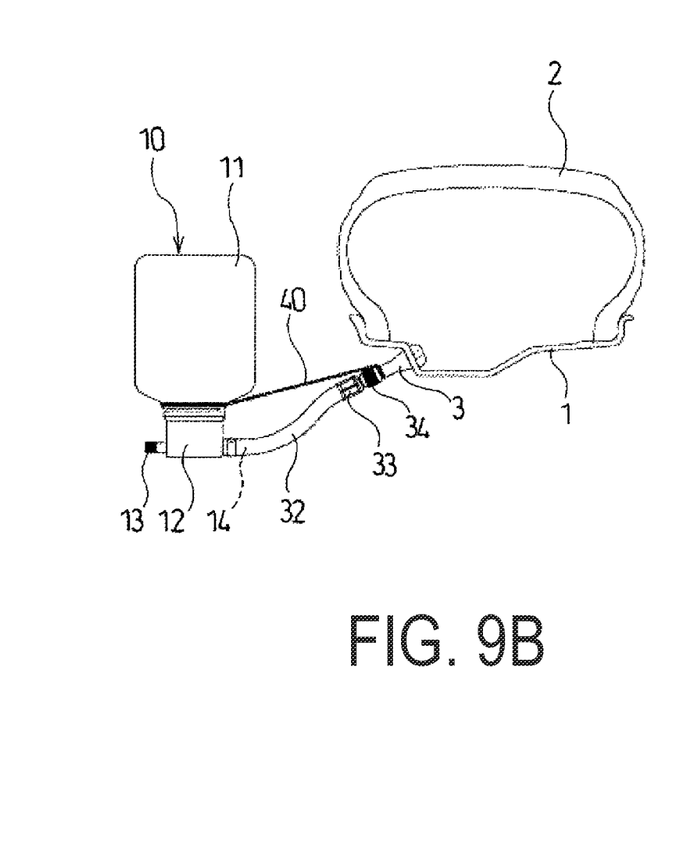
FIG. 9B is a side view illustrating a state of a later stage of injection.

FIGS. 8A and 8B each illustrate yet another modified example of the holding fixture, and FIGS. 9A and 9B illustrate a state in which the holding fixture of FIGS. 8A and 8B is mounted in the puncture repair kit. In FIGS. 8A and 8B, the holding fixture 40 has stretchability in part or in whole. In other words, the holding fixture 40 illustrated in FIGS. 8A and 8B has a first connecting portion 41 and a second connecting portion 42, and some or all of the holding fixture 40 is made of a material having stretchability such as that of rubber.

As illustrated in FIG. 9A, in a case where a holding fixture 40 having such stretchability is employed, in the initial stage of injection of the puncture repair liquid, the holding fixture 40 may extend and the container 10 may tilt due to the weight of the container 10 in which the puncture repair liquid is contained, and as illustrated in FIG. 9B, as the container 10 becomes lighter in the later stage of injection, the holding fixture 40 contracts and the container 10 is in an inverted state. As a result, the attitude of the container 10 that is in a pendent state from the tire valve 3 via the injection hose 32 during use can be appropriately set to reliably discharge the puncture repair liquid in the container 10. In other words, the inverted state of the container 10 need not necessarily be held from the initial stage of injection of the puncture repair liquid, and the inverted state of the container 10 only has to be achieved at least in the later stage of injection. In addition, in the injection process of the puncture repair liquid, a change in the attitude of the container 10 occurs, and thus it is possible to recognize the completion of the injection operation based on the attitude.

Figure 10A:
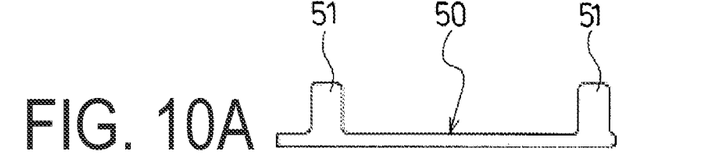
FIG. 10A is a side view thereof.
Figure 10B:
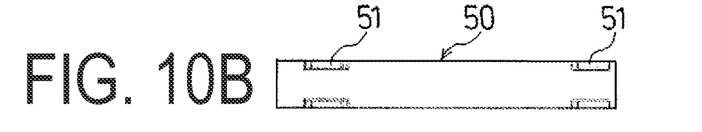
FIG. 10B is a plan view thereof.
Figure 10C:
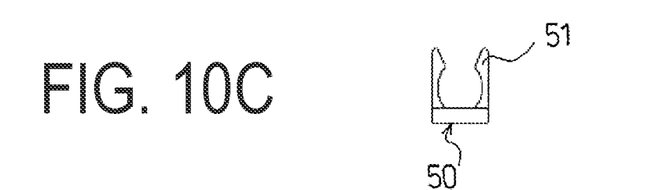
FIG. 10C is a front view thereof.
Figure 11:
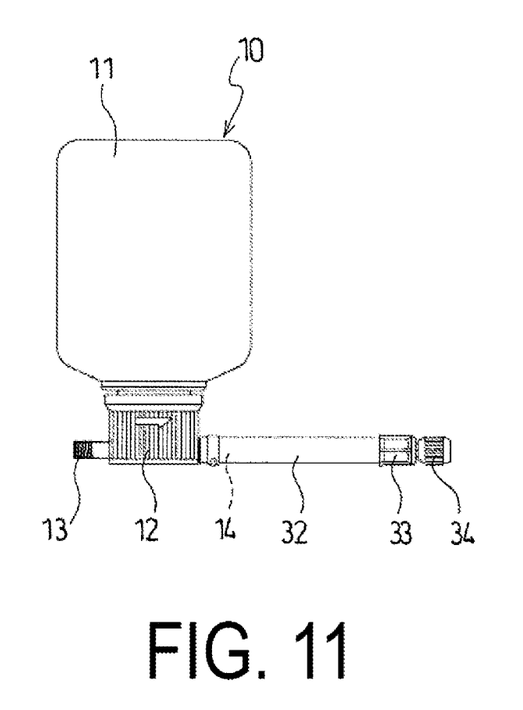
FIG. 11 is a side view illustrating a container and an injection hose.
Figure 12:
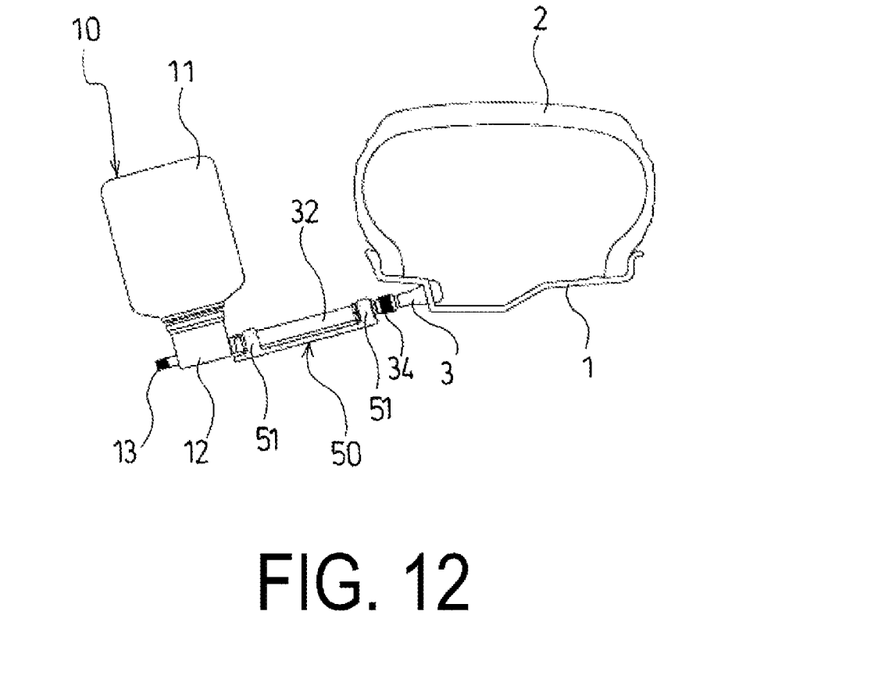
FIG. 12 is a side view illustrating a state in which the holding fixture of FIGS. 10A to 10C is mounted in the puncture repair kit.

FIGS. 10A to 10C illustrate a modified example of the holding fixture, FIG. 11 illustrates a container and an injection hose, and FIG. 12 illustrates a state in which the holding fixture of FIGS. 10A to 10C is mounted in the puncture repair kit. In FIGS. 10A to 10C, the holding fixture 50 has at least one engagement portion 51 that engages with the injection hose 32, and preferably has two engagement portions 51 that engage with both end portions in the longitudinal direction of the injection hose 32. Each of the engagement portions 51 includes a pair of fixing pieces that hold the injection hose 32 in between. The structure of the engagement portion 51 is not particularly limited, but it is preferable to employ a shape in which the injection hose 32 is not easily detached. Additionally, the holding fixture 50 is made of a material having a rigidity such as that of a resin or a metal, and has a length that spans the entire length of the pressurization hose 31. As illustrated in FIG. 12, the holding fixture 50 may extend linearly in a side view or may be curved or bent in a side view to hold the container 10 parallel with respect to the vertical direction.

As illustrated in FIGS. 11 and 12, the holding fixture 50 configured in this manner is mounted on the injection hose 32 by the engagement portion 51. In a state in which the holding fixture 50 is mounted on the injection hose 32, the holding fixture 50 then regulates the curvature of the injection hose 32. In particular, when the holding fixture 50 has two engagement portions 51 that engage with both end portions in the longitudinal direction of the injection hose 32, and one of the engagement portions 51 is mounted on the end on the container 10 side of the injection hose 32, and the other engagement portion 51 is mounted on the swaging metal fitting 33 of the injection hose 32, the curvature of the injection hose 32 can be effectively regulated, and the container 10 can be stably held. As a result, in performing injection operation of the puncture repair liquid, the attitude of the container 10 that is in a pendent state from the tire valve 3 via the injection hose 32 can be appropriately set to reliably discharge the puncture repair liquid in the container 10.

Figure 13A:
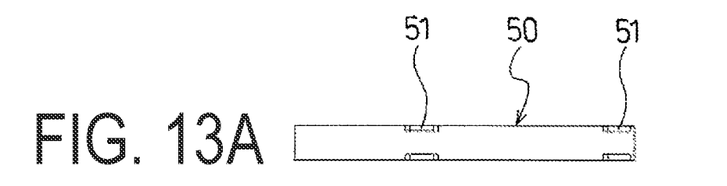
FIGS. 13A and 13B are plan views each illustrating a modified example of the holding fixture.
Figure 13B:
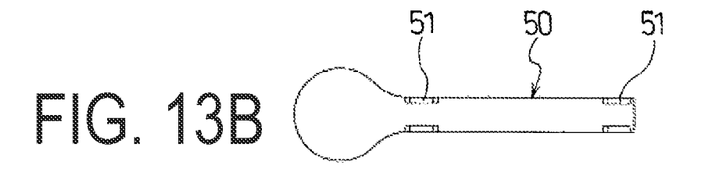
Figure 14:
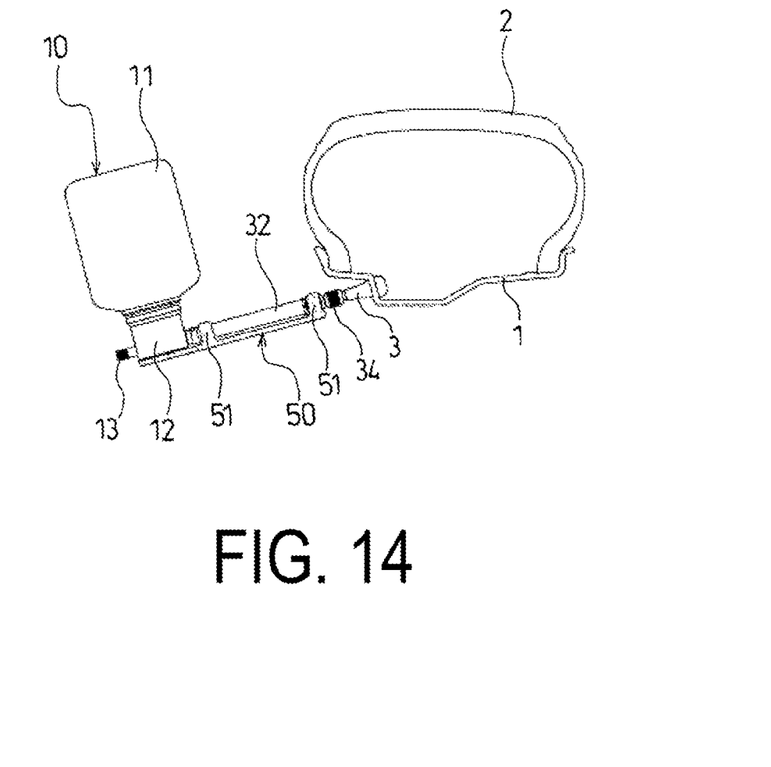
FIG. 14 is a side view illustrating a state in which the holding fixture of FIGS. 13A and 13B is mounted in the puncture repair kit.

FIGS. 13A and 13B each illustrate a modified example of the holding fixture, and FIG. 14 illustrates a state in which the holding fixture of FIGS. 13A and 13B is mounted in the puncture repair kit. The holding fixture 50 illustrated in FIGS. 13A and 13B is formed longer compared to the example illustrated in FIGS. 10A to 10C, extends through the entire length of the pressurization hose 31, and further extends to the lower region of the container 10. In the example of FIG. 13A, the holding fixture 50 has a constant width, however, in the example of FIG. 13B, the width of the holding fixture 50 is wider than other portions to match the shape of the cap 12 of the container 10 at the end of the holding fixture 50. In this case, it is preferred because the cap 12 is stably held. In addition, when protrusion portions or recess portions are respectively provided on opposing portions of the cap 12 and the holding fixture 50 and the two are engaged with each other, the stability thereof can be further increased.

The invention claimed is:

1. A puncture repair kit, comprising:
 a container in which puncture repair liquid is contained;
 a compressor that supplies compressed air;
 a pressurization hose connected between a pressurizing port of the container and the compressor; and,
 an injection hose connected between an outlet of the container and a tire valve, the puncture repair kit further comprising:
 a frame that holds an attitude of the container such that the container is in an inverted state in a state in which the container with the outlet being on a lower side is connected to the tire valve via the injection hose and is pendent from the tire valve; wherein the frame comprises a first end that serves to provide a connection to the tire valve and a second end that serves to provide a connection to the container.

2. The puncture repair kit according to claim 1, wherein the frame comprises a fastener configured to adjust a length of the frame.

3. The puncture repair kit according to claim 2, wherein the second end of the frame comprises a double-sided tape or a surface fastener.

4. The puncture repair kit according to claim 3, wherein the frame has stretchability in part or in whole.

5. The puncture repair kit according to claim 1, wherein the second end of the frame comprises a double-sided tape or a surface fastener.

6. The puncture repair kit according to claim 1, wherein the frame has stretchability in part or in whole.

7. A puncture repair kit, comprising:
a container in which puncture repair liquid is contained;
a compressor that supplies compressed air;
a pressurization hose connected between a pressurizing port of the container and the compressor; and,
an injection hose connected between an outlet of the container and a tire valve, the puncture repair kit further comprising:
a frame that holds an attitude of the container such that the container is in an inverted state in a state in which the container with the outlet being on a lower side is connected to the tire valve via the injection hose and is pendent from the tire valve; wherein
the frame comprises at least one projection that engages with the injection hose, and the frame regulates a curvature of the injection hose in a state in which the frame is mounted on the injection hose by the projection.

8. The puncture repair kit according to claim 7, wherein the frame comprises two projections that engage with both end portions of the injection hose.

* * * * *